April 20, 1937.   H. E. RUBENS   2,077,715
KEY WINDER
Original Filed Feb. 18, 1933
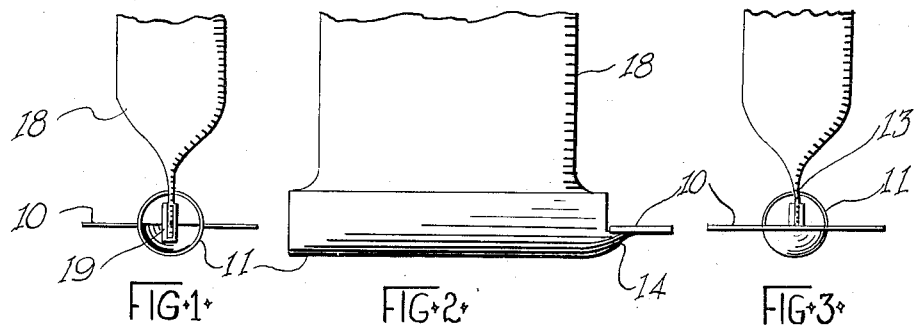
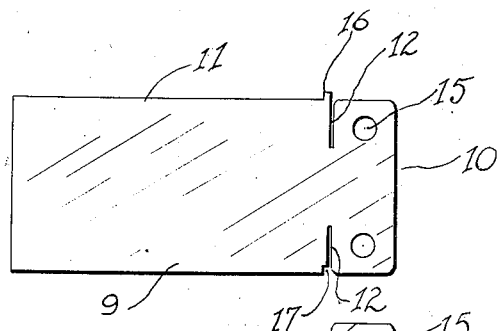
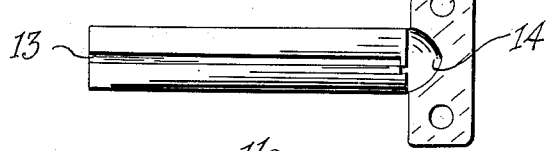
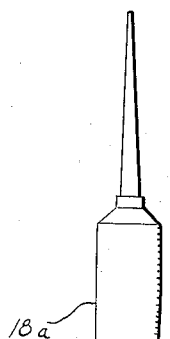
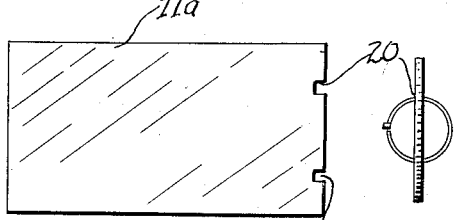
INVENTOR.
Harry Ernest Rubens Patented Apr. 20, 1937

2,077,715

UNITED STATES PATENT OFFICE 2,077,715

KEY WINDER

Harry Ernest Rubens, New York, N. Y.

Application February 18, 1933, Serial No. 657,319
Renewed January 26, 1937

6 Claims. (Cl. 221—60)

My invention relates to key winders for opening cans, rolling up paste tubes, and the like.

It has for its main object the provision of a simple means whereby the contents of a paste tube may be completely expelled with a minimum effort.

Another object consists in providing means, for accomplishing the aforementioned main object, which can be readily attached to any paste tube and as easily detached after rolling without uncoiling the said tube.

Still another object of my invention consists in providing means which will permit the walls of a tube to be compressed with the fingers over a conveniently smooth surface, starting with the full tube.

A further object of my invention consists in providing means which can be attached to tubes of various thicknesses, said means sufficiently resilient as to grip the full tube, when not in use, without loosening.

A still further object of my invention is to provide a device which can be made in a single piece from a flat stamping, structurally adapted to collapse the walls of a tube containing a viscous substance ordinarily difficult to expel by compressing with the fingers.

Other objects of my invention consist in providing a key adapted to be used in conjunction with a can for opening the same, of sufficiently large diameter to avoid the multitudinous revolutions associated with wire keys; in providing such a key of simple construction, easy to attach, manipulate, and detach, neat in appearance and inexpensive to manufacture.

These and various other objects and advantages will be readily understood from the following description and from the accompanying drawing of the preferred embodiments, but it will be noted that modifications might be made without departing from the spirit of the invention or the scope of the annexed claims.

In the drawing;

Figure 1 is a rear view of the device attached to a paste tube.

Figure 2 is a side view of the device similarly attached.

Figure 3 is a front view of the same.

Figure 4 is a plan view of the device before the body is rolled.

Figure 5 is a similar view with the body rolled into a cylinder.

Figure 6 is a plan view of an embodiment before rolling.

Figure 7 is an end view of the same after rolling.

Figure 8 is an ordinary coin used as the propelling means.

Figure 9 is a view of the device as attached to, and expelling the contents of, a nozzled medicinal tube.

As is indicated in Figure 4, the device consists initially in a flat blank of metal 9 comprising a handle 10 and a body 11 separated by two transverse slots 12. The next step consists in forming the body 11 longitudinally into a cylinder, the two longitudinal edges of the body forming an elemental slot 13. Approximately one half of the width of the blank remains at the junction of the handle 10 and the body 11 and in the forming process this metal is rolled with the body, the rolling extending partially into the handle to form the rib 14. Thus the handle is materially attached to the body for approximately one half the circumference of the cylinder, giving the handle a torsional strength which is structurally increased by the rib 14. The handle 10 may be perforated at 15 for convenience.

The reinforcing of the handle by the formation of the rib 14 produces two desirable results. It enables the handle to lie in a plane passing through the axis of the key body (see Figs. 1, 2, 3, and 9) thus enabling a turning couple to be applied directly to the key body while winding the key, eliminating any eccentricity in the movement of the handle. It makes possible a reduction in the thickness of the sheet metal employed to a thinness depending on the product in the tube where costs are reduced to a minimum.

That portion of the slot 12, adjacent to the handle, terminates in a stop 16. This stop is formed in the initial blanking operation by the die, its action forming the stop 16 in one blank, and a corresponding indentation in the adjacent blank, similar in appearance to the indentation designated by the reference numeral 17. The amount of protrusion of the stop 16 is approximately equal to the width of the slot 13. Thus when the body is rolled, the stop 16 arrives in juxtaposition to the indentation 17, as indicated in Figure 5. This method of forming the stop enables the keys to be formed successively without waste between blanks.

In Figure 1, the reference numeral 18 designates the lower portion of the paste tube sealed at the filling end with a clip 19. The key is applied to the tube by inserting the collapsed portion of the tube, adjacent to the clip, transversely into the slot 13, the clip 19 entering the tubular section of the body 11. The tube is forced into the slot 13 and moved laterally until the stop 16 impedes its further progress. One essential element of the invention comes into play at this point; that is the resiliency of the tubular wall of the body 11 which enables the key to be attached to tubes of varying thicknesses and grips them with a resiliency sufficient to prevent accidental loosening. This is important where an individual finds a key in a carton along with the tube and inserts it on the tube before he has any immediate need for it. It must stay there while the tube is being handled so that no time is spent looking for the key when its need materializes.

The effect of the resiliency of the key makes a consideration of the diameter of the body unnecessary. For if the body did not grip the full tube, even though no immediate need existed, then the diameter of the tube should be as small as possible consistent with the size of the sealing clip which it encloses. This would permit the key to be encircled as quickly as possible with the tube which would tend to hold the key to the tube by friction. The resiliency eliminates this question.

The key is now in position and ready for use and the body 11 may be manually rotated by the handle 10 in either direction, the fingers pressing the tube against the body 11 and evacuating the contents as the handle is turned.

In Figures 6 and 7 is shown a modification of the invention which utilizes a coin or token, to be used where limitations of space forbid the integral type of handle. The modification consists in providing two slots 20 formed so that a token or coin 21 can be inserted therein and the body 11a rotatably propelled as though it were integral with the coin 20, as shown in Figure 7.

In Figure 9 is shown a type of tube 18a used for expelling its medicinal contents within some orifice of the body. It is sometimes necessary to expel completely and in one operation, the entire contents of the tube. More often the contents consist of a thick viscous substance, resisting pressure and difficult to expel through the long nozzle of the tube. Here the key clearly indicates its superior qualities by permitting the tube to be rolled up manually as the ingredients are completely expelled, the sealing clip stored within the key so that a smooth surface is constantly presented, thus aiding in the complete evacuation of the contents. When the tube is completely wound upon the key, the two may be separated by reversing the direction of rotation for a fraction of the turn, which action releases the key permitting it to be withdrawn with ease laterally, without unwinding the tube. Attention is called to two facts: first, that the tube is held in a stationary position as the key is being rotatably propelled in a linear direction, and secondly, that the key must be so constructed as to permit rotation in either direction, as occurs when the key is reversed, when detached.

In using the key on cans, the operation is almost identical. The overhanging lip of that portion of the can which is to be removed by winding, is inserted into the slot 13, and the key is rotated so that the removable portion is wound up around the key. The key may be removed laterally at any time, similarly as indicated supra. In the manufacture of such a key, the diameter of the body should be large enough to avoid multitudinous rotations and the slot 13 should be as small as possible, consistent with ease of application, and the length of body sufficient to accommodate cans of various sizes.

Distinctive features of the invention are its simplicity, thus making it easy to install; its low manufacturing cost, thus permitting universal use; its design, thus permitting smoothness of operation; its accessibility, thus permitting the tube to be rolled up wherever it is desired to expel its contents; its detachability, thus permitting reuse; its convenience, thus permitting the tube to be hung up when not in use; its resiliency, thus permitting the key to be attached before using; and its size, thus enabling the key to be inserted in a carton with the tube without enlarging said carton.

I have accordingly described my invention, but I desire it understood that it is not confined to the particular form shown and described, the same being merely illustrative, and that the invention may be carried out without departing from the spirit of my invention, and therefore I claim broadly the right to employ all equivalent instrumentalities coming within the scope of the appended claims and by means of which the objects of my invention are obtained and new results accomplished, as it is obvious that the particular embodiments herein shown and described are only some of the many that can be employed to attain these objects and accomplish these results.

I claim:

1. A key for a tube, the closed lower end of which tube is thicker than two wall thicknesses of said tube, comprising a cylindrical body; a handle integral therewith and a longitudinal slot extending along said cylindrical body, the width of said slot being slightly less than the closed lower end of said tube, the walls of said cylindrical body possessing a slight resiliency whereby when said key is slipped laterally over said closed lower end, it is prevented from accidentally slipping off the end of said tube and from sliding freely sidewise on said tube, yet capable of being withdrawn from the tube while wound around the key.

2. A key for a collapsible tube, the closed lower end of which tube is thicker than two wall thicknesses of said tube; comprising a cylindrical body; a handle integral therewith; and a longitudinal slot extending along said cylindrical body, the width of the slot being less than the thickness of the closed lower end of the tube; the walls of said cylindrical body possessing a slight resiliency, whereby when said key is slipped laterally over said closed lower end, with the lower end of the tube in the cylindrical body and protruding through the slot, it is prevented from accidentally slipping off the end of said tube, yet capable of being withdrawn from the tube while wound around the key; and stop means on said key to control the limit of the transverse movement of said key as it is slipped over the lower end of said tube.

3. A key for winding a collapsible tube having a closed flat end, said key being made of a piece of sheet metal and comprising a tubular portion having opposed edges disposed in spaced relation to provide a slot for receiving said tube and a handle integral therewith and connected to one end of the tubular portion along substantially half the circumference thereof and formed with a rounded depression adjacent said end of the tubular portion said depression having a gradual change in form from round to flat, in every direction from the point at which the tube body is attached to the handle portion whereby a strong and rigid connection between the tubular portion and the handle is provided.

4. A key for winding a collapsible tube, said key comprising a piece of sheet metal bent into tubular form with opposite edges in spaced relation and forming a longitudinally extending slot for receiving the closed end of the tube, said sheet metal having a projection on one of said edges forming an abutment to limit relative movement longitudinally of the key, and a handle for turning the key.

5. A key for winding a collapsible tube, said key comprising a piece of sheet metal bent into tubular form with opposite edges in spaced relation and forming a longitudinally extending slot for receiving the closed end of the tube, said sheet metal having a projection on one of said edges forming an abutment to limit relative movement longitudinally of the key, the opposite edge being recessed to an extent at least complementary to said projection.

6. A key for winding a collapsible tube having a closed flat end, said key being made from a piece of sheet metal and comprising a tubular portion having opposed parallel straight edges disposed in spaced relation to provide a slot for receiving the closed flat end of said collapsible tube inserted edgewise into said slot, the opposed parallel straight edges of the tubular portion forming said slot sufficiently close together to compress the closed flat end of the collapsible tube and retain said closed flat end frictionally in position against accidental displacement, said key structurally adapted to be withdrawn from the tube when fully wound around the tubular portion of said key by laterally withdrawing said key from said tube against said frictional action, and a handle, integral with said tubular portion, and formed with a rounded depression adjacent said end of the tubular portion, said depression having a gradual change in form from round to flat, in every direction from the point at which the tubular body is attached to the handle portion, whereby a strong and rigid connection between the tubular portion and the handle is provided.

HARRY ERNEST RUBENS.